Patented Dec. 22, 1931

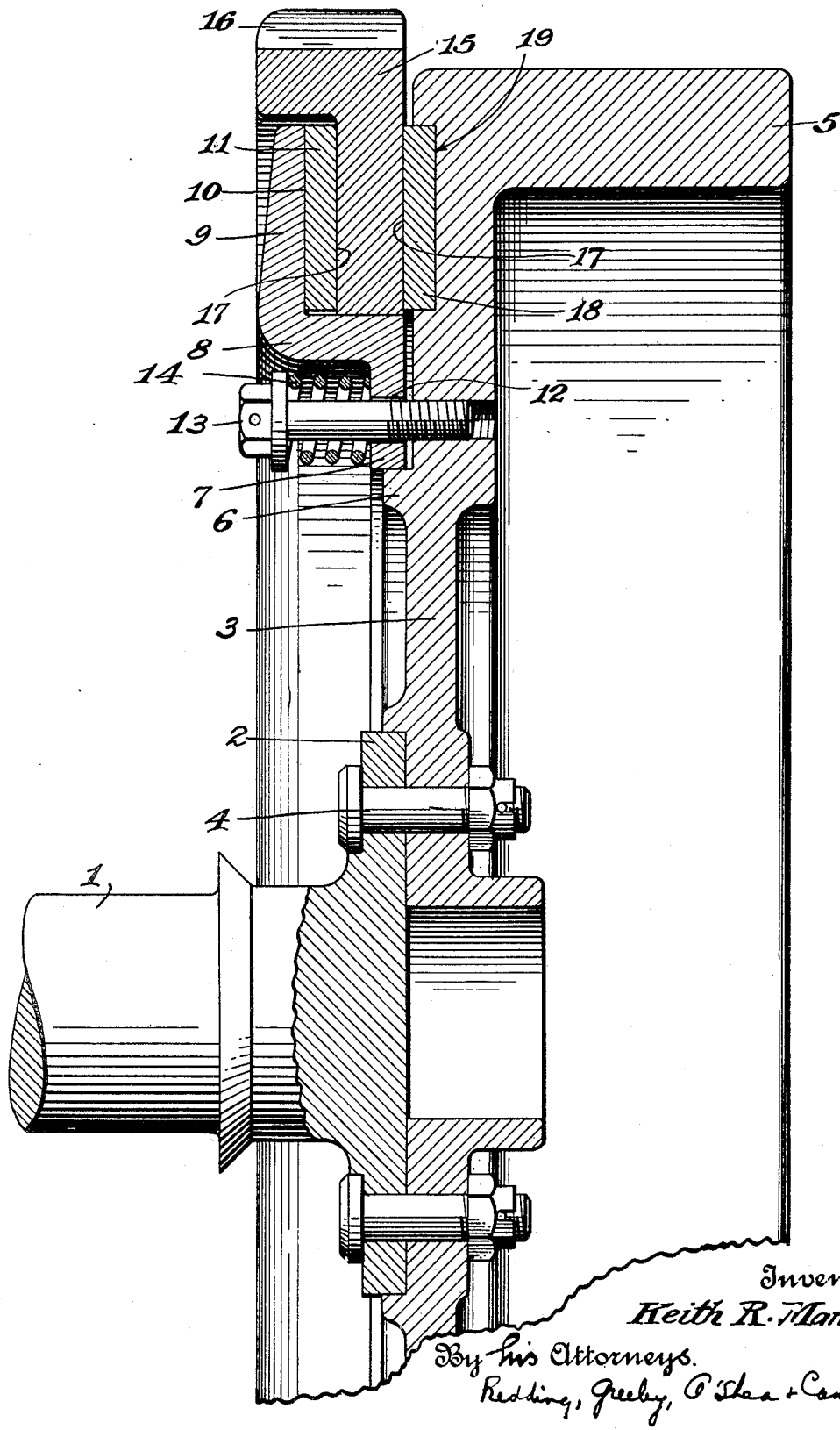

1,838,023

UNITED STATES PATENT OFFICE

KEITH R. MANVILLE, OF HIGHLAND PARK, NEW JERSEY, ASSIGNOR TO INTERNATIONAL MOTOR COMPANY, OF NEW YORK, N. Y., A CORPORATION OF DELAWARE

FLYWHEEL VIBRATION DAMPER

Application filed July 2, 1930. Serial No. 465,338.

The present invention relates to devices for damping vibrations of a rotating shaft and embodies, more specifically, an improved damper for damping the vibrations of a flywheel.

Devices for damping the vibrations of the crank shafts of internal combustion engines have been provided, these devices usually taking the form of an independent element which resists any tendency, particularly a sudden one, of the rotating element to change its speed of rotation. As an independent element they have required additional labor and expense in installing, as well as additional space in the power unit. In some units, it has been found difficult to find adequate room for the devices without seriously and objectionably altering the design.

The present invention seeks to provide means for damping the vibrations above referred to, at the same time utilizing the elements of the damping device for other purposes. It is further contemplated to utilize the now standard elements of a motor vehicle, affording a means for damping undesirable vibrations without detracting from the normal functioning of such elements.

An object of the invention, accordingly, is to provide a device for damping the vibrations of a rotating member, such device being constructed from the normal elements usually associated with the rotating member, and such elements performing their normal functions in an undisturbed fashion.

A further object of the invention is to incorporate in a flywheel structure a device for damping the vibrations thereof.

A further object of the invention is to provide a flywheel vibration damper, such damper being constructed of a relatively light portion of the flywheel, thus not impairing the function of the flywheel while affording the desired damping effect.

Further objects, not specifically enumerated above, will be apparent as the invention is described in greater detail in connection with the accompanying drawing, wherein the single figure is a view in section taken in a plane passing through the axis of the flywheel, the view being enlarged and broken away in the interest of clearness.

Referring to the above drawing a crank shaft is shown at 1, having a flanged extremity 2. A flywheel spider 3 is secured to the flange 2 by means of bolts 4 and is formed with a weighted cylindrical inertia portion 5 to provide the desired flywheel effect. An annular shoulder 6 is formed on the spider 3 and mounts a disc 7, the latter being formed with an offset peripheral portion 8 having a clutch plate 9. The clutch plate 9 is formed with a surface 10 which is parallel to the flywheel spider 3 and engages an annular friction disc 11. The disc 7 is formed with a plurality of apertures 12 through which bolts 13 extend, these bolts being threaded into the spider 3 of the flywheel. Springs 14 are seated under the heads of the bolts 13 and urge the disc 7 toward the flywheel spider 3. Seated on the offset portion 8 of the disc 7, is a ring 15 having gear teeth 16 on its outer periphery to be engaged by a starter gear in the usual manner. The ring 15 has friction surfaces 17 on its opposite sides, one surface engaging the friction disc 11 and the other surface engaging a second friction disc 18, preferably carried in a recess 19 in the flywheel spider 3.

From the foregoing, it will be seen that the flywheel 5 performs its usual functions in an unimpaired manner, the ring 15, at the same time, affording means for damping vibrations of the flywheel. This ring further affords a gear connection with a starting mechanism to enable the engine to be started in the usual fashion.

While the invention has been described with specific reference to the accompanying drawing, it is not to be limited, save as defined in the appended claim.

I claim as my invention:

In combination, a flywheel, a disc secured to the flywheel and movable axially thereof, an offset portion on the disc, a radial flange on the offset portion, a ring having gear teeth formed on its periphery and mounted rotatably in the offset portion between the flange and flywheel, and friction plates between the ring, the flange and flywheel.

This specification signed this 27 day of June, A. D. 1930.

KEITH R. MANVILLE.